3,558,724
INORGANIC PROCESS FOR PRODUCING HYDRO-
CARBON COMPOUNDS BY REACTION OF HY-
DROGEN AND CRYSTALLINE CARBONATES
Charles A. Salotti, 660 Riverhill Drive,
Athens, Ga. 30601
No Drawing. Filed Aug. 30, 1968, Ser. No. 756,407
Int. Cl. C07c 9/00
U.S. Cl. 260—676                                         8 Claims

ABSTRACT OF THE DISCLOSURE

The process for producing hydrocarbon compounds wherein a crystalline carbonate material, such as calcite, dolomite and siderite, is heated in a pressurized hydrogen atmosphere to provide for a chemical reaction between the hydrogen and the carbonate crystal surface resulting in useful hydrocarbon compounds.

BACKGROUND OF THE INVENTION

The natural supply of liquid and gaseous hydrocarbons which are basic raw materials in an industrialized society is limited. It is an object of this invention, therefore, to provide a process for recovering hydrocarbon compounds from the essentially unlimited supply of carbon bearing rocks and minerals on the earth's surface.

SUMMARY OF THE INVENTION

In the process of this invention, a crystalline carbonate material selected from the group consisting of calcite ($CaCO_3$), dolomite (Ca, Mg, $CO_3$) and siderite ($FeCO_3$) is the basic raw material. This raw material can be in a particlized form, such as micron size powders, it can consist of single carbonate crystals measuring several millimeters on edge, and it can consist of rocks comprised primarily of one or more of these carbonates. For example, oil shale consists essentially of dolomite and is one such suitable raw material in rock form. Also, it is to be understood that in terms of the present process, aragonite is considered to be the same as calcite because it has the same chemical composition as calcite. Consequently, the term "crystalline carbonate material," as used herein, is inclusive of all of these forms of the raw material. The reaction rates are faster when the raw material is in small particle form, because of the increased raw material surface area, and for this reason a somewhat powdered form of the raw material is preferred. The raw material is heated in an enclosed oxygen free atmosphere and is then subjected to an excess of hydrogen gas under pressure to form the desired hydrocarbon compounds. The result is a direct reaction between the crystalline carbonate material and the hydrogen gas, and the rate of hydrocarbon formed is primarily a function of the temperature at which the reaction is carried out. Valuable solid reaction products are also produced as a by-product during the practice of the process of this invention and include carbon in the form of fine graphite, CaO, and Ca(OH). The purity of the hydrocarbon compounds produced according to this invention make them particularly desirable for starting materials in many chemical processes.

Further objects, features and advantages of this invention will become apparent from the following detailed description of examples and the appended claims.

In the following specific examples, the following procedure was followed:

(1) A crystalline carbonate material of 40–60 mesh particle size was loosely contained in platinum foil so that the surrounding atmosphere could readily reach the raw material.

(2) The thus contained raw material was placed in a sealed stainless steel vessel connected to a pressure system capable of selectively feeding helium or hydrogen under pressure into the vessel. The vessel was flushed with helium at a pressure of approximately 1000 p.s.i., and then charged with helium so that the helium in the vessel was at a pressure of approximately 1000 p.s.i. and an oxygen free atmosphere was insured.

(3) The vessel was heated until the temperature of the atmosphere therein reached the desired operating temperature, following which the helium was vented and the vessel was flushed with hydrogen to remove the helium.

(4) Hydrogen was pumped into the vessel until the hydrogen pressure therein reached the desired operating pressure. The size of the vessel and the volume of raw material therein were such that a large excess of hydrogen was present in the vessel.

(5) The vessel was maintained at the operating temperature for a predetermined time period hereinafter referred to as the "duration of run."

(6) The gaseous hydrocarbon compounds produced were withdrawn from the vessel and subjected to mass spectrographic analysis to determine the percentage by weight of hydrocarbon compounds therein.

(7) The vessel was cooled and the resulting solid and liquid reaction products in the vessel were removed.

EXAMPLE I

Raw material: calcite
Operating temperature: 420° C.
Operating pressure: 9800 p.s.i.
Duration of run: 18 hours
The resulting gaseous product contained the following:
  0.04% methane

EXAMPLE II

Raw material: calcite
Operating temperature: 580° C.
Operating pressure: 9900 p.s.i.
Duration of run: 20 hours
The resulting gaseous product contained the following:
  0.26% methane

EXAMPLE III

Raw material: calcite
Operating temperature: 605° C.
Operating pressure: 2000 p.s.i.
Duration of run: 16 hours
The resulting gaseous product contained the following:
  1.38% methane

EXAMPLE IV

Raw material: calcite
Operating temperature: 700° C.
Operating pressure: 200 p.s.i.
Duration of run: 2 hours
The resulting gaseous product contained the following:
  1.83% methane

EXAMPLE V

Raw material: calcite
Operating temperature: 700° C.
Operating pressure: 2000 p.s.i.
Duration of run: 4 hours
The resulting gaseous product contained the following:
1.34% methane

EXAMPLE VI

Raw material: calcite
Operating temperature: 790° C.
Operating pressure: 2000 p.s.i.
Duration of run: 2 hours
The resulting gaseous product contained the following:
1.43% methane

EXAMPLE VII

Raw material: dolomite
Operating temperature: 520° C.
Operating pressure: 5000 p.s.i.
Duration of run: 4 hours
The resulting gaseous product contained the following:
0.01% methane

EXAMPLE VIII

Raw material: dolomite
Operating temperature: 735° C.
Operating pressure: 5000 p.s.i.
Duration of run: 8 hours
The resulting gaseous product contained the following:
1.82% methane and 0.04% ethane

EXAMPLE IX

Raw material: dolomite
Operating temperature: 735° C.
Operating pressure: 5000 p.s.i.
Duration of run: 4 hours The resulting gaseous product contained the following:
1.88% methane

EXAMPLE X

Raw material: dolomite
Operating temperature: 835° C.
Operating pressure: 5000 p.s.i.
Duration of run: 4 hours The resulting gaseous product contained the following:
2.12% methane

EXAMPLE XI

Raw material: siderite
Operating temperature: 345° C.
Operating pressure: 200 p.s.i.
Duration of run: 4 hours The resulting gaseous product contained the following:
0.01% methane and 0.01% ethane

EXAMPLE XII

Raw material: siderite
Operating temperature: 400° C.
Operating pressure: 2000 p.s.i.
Duration of run: 4 hours The resulting gaseous product contained the following:
4.45% methane, 0.28% ethane, 0.01% propane and 0.03% butane

EXAMPLE XIII

Raw material: siderite
Operating temperature: 455° C.
Operating pressure: 2000 p.s.i.
Duration of run: 4 hours The resulting gaseous product contained the following:
4.34% methane, 0.42% ethane, 0.23% propane and 0.05% butane From the above description it is seen that this invention provides a process for obtaining hydrocarbon compounds directly from such carbonates as calcite, dolomite and siderite by subjecting these carbon bearing rock and mineral materials to heat and reacting the heated materials with hydrogen. The process is primarily temperature dependent. For example, a comparison of Examples I through VI demonstrates that as the process is carried out at higher temperatures, an increased hydrocarbon yield is obtained. A comparison of Examples IV and V shows that when the process is carried out at a given temperature, an increase in the pressure and the time duration of the process does not increase the hydrocarbon yield. Methane, ethane, propane and butane are obtainable by the process of this invention which is typically carried out at a temperature of at least 400° C., even though Example XI shows that the process can be carried out at a lower temperature.

In all of the specific examples included herein, the carbonate raw material was completely consumed by the end of the run, thus indicating that the desired hydrocarbons are produced continuously during the process commencing immediately upon contact of the hydrogen gas with the heated crystalline surfaces. Also, while specific example information is not included herein where the process was carried out with hydrogen pressures only slightly above ambient, the process has been satisfactorily carried out under this condition. Thus, the hydrogen need only be at a pressure sufficient to insure intimate contact of the hydrogen gas with the crystalline surfaces.

It will be understood that an inorganic process for producing hydrocarbon compounds by reaction of hydrogen and crystalline carbonates which is herein disclosed and described is presented for purposes of explanation and is not intended to indicate limits of the invention, the scope of which is defined by the following claims.

What is claimed is:

1. The inorganic process for producing paraffinic hydrocarbon compounds by reaction of hydrogen and crystalline carbonates comprising the steps of:
    (a) heating a crystalline carbonate material selected from the group consisting of calcite, dolomite and siderite to a predetermined temperature of at least 200° C.; and
    (b) subjecting said heated material to hydrogen gas under pressure.

2. The process according to claim 1 wherein said material is in particle form.

3. The process according to claim 1 wherein said material is maintained at said operating temperature in an atmosphere consisting essentially of hydrogen gas for a period of at least 2 hours.

4. The process according to claim 1 wherein graphite, CaO and Ca(OH) are produced as reaction by-products.

5. The inorganic process for producing paraffinic hydrocarbon compounds comprising the steps of:
    (a) enclosing particles of a crystalline carbonate material selected from the group consisting of calcite, dolomite and siderite in an oxygen free atmosphere;
    (b) heating said material to a temperature of at least 400° C.;
    (c) replacing said atmosphere with hydrogen gas under pressure;
    (d) maintaining said material at substantially said temperature for a period of at least two hours in the presence of said hydrogen gas under pressure to cause a chemical reaction between said material and said hydrogen; and
    (e) removing gas containing hydrocarbon compounds from said enclosed atmosphere.

6. The process according to claim 5 wherein said material is calcite.

7. The process according to claim 5 wherein said material is dolomite.

8. The process according to claim 5 wherein said material is siderite.

References Cited

UNITED STATES PATENTS

| | | | |
|---|---|---|---|
| 1,772,652 | 8/1930 | White | 260—676 |
| 2,563,607 | 8/1951 | Kirshenbaum et al. | 260—676 |
| 1,746,464 | 2/1930 | Fischer et al. | 260—676 |
| 1,643,663 | 9/1927 | Klatte et al. | 260—676 |

OTHER REFERENCES

Elserier: "Treatise of Inorganic Chemistry," p. 432, Amsterdam, Houston, London, New York, 1956.

Kerk-Othmer: "Encyclopedia of Chemical Technology," second ed., vol. 12, pp. 417 and 429; vol. 4, pp. 357 and 358.

DELBERT E. GANTZ, Primary Examiner

J. NELSON, Assistant Examiner